(12) United States Patent
Kim et al.

(10) Patent No.: US 10,592,799 B1
(45) Date of Patent: Mar. 17, 2020

(54) DETERMINING FL VALUE BY USING WEIGHTED QUANTIZATION LOSS VALUES TO THEREBY QUANTIZE CNN PARAMETERS AND FEATURE VALUES TO BE USED FOR OPTIMIZING HARDWARE APPLICABLE TO MOBILE DEVICES OR COMPACT NETWORKS WITH HIGH PRECISION

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang (KR)

( * ) Notice: Subject to any disclaimer, the term of this patent is extended or adjusted under 35 U.S.C. 154(b) by 0 days.

(21) Appl. No.: 16/255,012

(22) Filed: Jan. 23, 2019

(51) Int. Cl.
*G06N 3/04* (2006.01)
*G06N 3/08* (2006.01)
*G06F 17/16* (2006.01)

(52) U.S. Cl.
CPC .............. *G06N 3/04* (2013.01); *G06F 17/16* (2013.01); *G06N 3/08* (2013.01)

(58) Field of Classification Search
CPC .............. G06N 3/04; G06N 3/08; G06F 17/16
See application file for complete search history.

(56) References Cited

U.S. PATENT DOCUMENTS

| 2018/0046894 | A1* | 2/2018 | Yao | .......................... G06F 7/483 |
| 2019/0095777 | A1* | 3/2019 | Kim | .......................... G06N 3/08 |

OTHER PUBLICATIONS

Gysel, Philipp. "Ristretto: Hardware-oriented approximation of convolutional neural networks." arXiv preprint arXiv:1605.06402 (2016). (Year: 2016).*

(Continued)

*Primary Examiner* — Vincent Gonzales
*Assistant Examiner* — Kevin W Figueroa
(74) *Attorney, Agent, or Firm* — Xsensus, LLP

(57) ABSTRACT

There is provided a method for determining an FL value to be used for optimizing hardware applicable to mobile devices, compact networks, and the like with high precision. The method includes steps of: a computing device (a) applying quantization operations to original values included in an original vector by referring to a BW value and each of FL candidate values, to thereby generate each of quantized vectors, including the quantized values, corresponding to each of the FL candidate values; (b) generating each of weighted quantization loss values, corresponding to each of the FL candidate values, by applying weighted quantization loss operations to information on each of differences between the original values and the quantized values included in each of the quantized vectors; and (c) determining the FL value among the FL candidate values by referring to the weighted quantization loss values and a device using the same.

16 Claims, 4 Drawing Sheets

(56) References Cited

OTHER PUBLICATIONS

Gysel, Philipp, et al. "Ristretto: A framework for empirical study of resource-efficient inference in convolutional neural networks." IEEE Transactions on Neural Networks and Learning Systems 29.11 (2018): 5784-5789. (Year: 2018).*

Lin, Darryl, Sachin Talathi, and Sreekanth Annapureddy. "Fixed point quantization of deep convolutional networks." International Conference on Machine Learning. 2016. (Year: 2016).*

* cited by examiner

US 10,592,799 B1

DETERMINING FL VALUE BY USING WEIGHTED QUANTIZATION LOSS VALUES TO THEREBY QUANTIZE CNN PARAMETERS AND FEATURE VALUES TO BE USED FOR OPTIMIZING HARDWARE APPLICABLE TO MOBILE DEVICES OR COMPACT NETWORKS WITH HIGH PRECISION

FIELD OF THE DISCLOSURE

The present disclosure relates to a method for determining a FL value by using weighted quantization loss values to thereby quantize CNN parameters and feature values, to be used for optimizing hardware applicable to mobile devices or compact networks with high precision; and more particularly, the method for determining the FL value, which is an FL parameter corresponding to a size of an LSB included in quantized values, including steps of: (a) if an original vector including original values is acquired, applying quantization operations to the original values by referring to (i) a BW value, which is a BW parameter corresponding to the number of bits used to represent each of the quantized values, and (ii) each of FL candidate values, to thereby generate each of quantized vectors, including the quantized values, corresponding to each of the FL candidate values; (b) generating each of weighted quantization loss values, corresponding to each of the FL candidate values, by applying weighted quantization loss operations to information on each of differences between the original values included in the original vector and the quantized values included in each of the quantized vectors; and (c) determining the FL value among the FL candidate values by referring to the weighted quantization loss values; and a computing device using the same.

BACKGROUND OF THE DISCLOSURE

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of the machine learning.

However, there was a prejudicial perception that 32-bit floating point operations are needed for the deep learning algorithms, so that mobile devices may be considered as not being capable of performing programs including the deep learning algorithms.

However, by some experiments, it was proved that 10-bit fixed point operations, which require less computing power than the 32-bit floating point operations, are sufficient for the deep learning algorithms. Thus, there were many attempts to provide methods for using the 10-bit fixed point operations for the deep learning algorithms in devices with limited resources, i.e, the mobile devices. Among the methods, a method named "Dynamic Fixed Point", suggested by a thesis named "Caffe-Ristretto", became widespread. The "Dynamic Fixed Point" method is distinctive from other methods in that each of transitional FL values may be applied to each of parts included in a CNN. Herein, the FL value is a parameter corresponding to a size of an LSB included in quantized values, and the LSB is a bit position in a binary number having the smallest value, i.e, a unit value. Owing to the transitional FL values, different FL values can be applied to different channels during processes of the quantization, which approximates floating point values to fixed point values, so that quantization errors could be reduced. In the "Dynamic Fixed Point" method, quantization errors of the largest value among the original floating point values are referred to determine the FL value.

However, the process of determining the FL value proposed by the conventional "Dynamic Fixed Point" method have a critical shortcoming. In a neural network, the original floating point values, including values of parameters or feature maps do not follow a certain distribution. Rather, the values are irregularly distributed, most of them small and very few of them large. Thus, if the FL value is determined by referring to quantization errors of the largest value among the original floating point values, quantization errors of values which are relatively smaller than the largest value may be too large.

FIG. 4 shows each of variations of quantized values included in each of channels according to a conventional method.

By referring to FIG. 4, it may be seen that a difference between a variation of a first channel and a variation of a second channel is very large. It is because the FL value for the quantization is determined by referring to the quantization errors of the biggest value, so that small values are not quantized properly. This is a disadvantage because the large difference of the variations among the channels may cause distortion on output values.

SUMMARY OF THE DISCLOSURE

It is an object of the present disclosure to solve all the problems explained above.

It is another object of the present disclosure to provide a method for quantizing floating point values, whose sizes are various, to fixed point values more accurately by referring to weighted quantization loss values, even if the floating point values are quantized by using a same FL value.

In accordance with one aspect of the present disclosure, there is provided a method for determining an FL value, which is an FL parameter corresponding to a size of an LSB included in quantized values, including steps of: (a) a computing device, if an original vector including original values is acquired, applying quantization operations to the original values by referring to (i) a BW value, which is a BW parameter corresponding to the number of bits used to represent each of the quantized values, and (ii) each of FL candidate values, to thereby generate each of quantized vectors, including the quantized values, corresponding to each of the FL candidate values; (b) the computing device generating each of weighted quantization loss values, corresponding to each of the FL candidate values, by applying weighted quantization loss operations to information on each of differences between the original values included in the original vector and the quantized values included in each of the quantized vectors; and (c) the computing device determining the FL value among the FL candidate values by referring to the weighted quantization loss values.

As one example, at the step of (a), the quantization operations follow a formula below, $$ak - th \text{ element of } \vec{Q_l} = \min\left(2^{BW-FL-1}, \max\left(-2^{BW-FL-1}, \frac{\lfloor x_k \times 2^{FL} + \epsilon \rfloor}{2^{FL}}\right)\right)$$

wherein, $\vec{Q}_l$ is an l-th quantized vector, $x_k$ is a k-th original value included in the original vector, $\epsilon$ is a constant for determining a type of the quantization operation, and [ ] is a Gaussian operation.

As one example, at the step of (b), the weighted quantization loss operations generate each of the weighted quantization loss values corresponding to each of the FL candidate values by referring to a weight vector, wherein the weight vector includes at least part of weight values generated by referring to sizes of the original values.

As one example, at the step of (b), the weighted quantization loss operation follows a formula below, $L_l = \|\vec{W} \cdot (\vec{Q}_l - \vec{x})\|_p$ wherein $\vec{x}$ is the original vector, $Q_l$ is an l-th quantized vector, $\vec{W}$ is a weight vector, which includes at least part of weight values generated by referring to sizes of the original values · is an operation that generates an integrated vector whose elements are determined as results of element-wise multiplication of the weight vector $\vec{W}$ and a difference vector $(\vec{Q}_l - \vec{x})$, and $\| \|_p$ is an L-P norm operation.

As one example, the original values include (i) CNN parameters of an arbitrary specific layer in a CNN and (ii) feature values of a feature map, corresponding to a training image to be used for determining the FL value, while the specific layer is processing the feature map.

As one example, the FL value is an optimized value so that the weighted quantization loss values are smaller than a threshold value when the values of the feature map are quantized, at least part of the values of the feature map being included in different channels thereof.

As one example, the method further includes a step of: (d) the computing device applying the quantization operations to parameters included in each layer of a CNN by referring to the FL value and the BW value, to thereby generate quantized parameters.

As one example, the method further includes steps of: (e) the computing device, if test values are acquired, instructing the CNN to apply convolution operations to the test values by using the quantized parameters to thereby generate test feature values, and instructing the CNN to accumulate the test feature values; and (f) the computing device applying the quantization operations to the accumulated test feature values by referring to the FL value and the BW value to thereby generate quantized test feature values, and storing the quantized test feature values in a memory space.

As one example, at the step of (e), the test values are acquired in a fixed point form, and the test feature values are generated in a floating point form, and the computing device instructs the CNN to accumulate the test feature values in the floating point form, and wherein, at the step of (f), the computing device generates the quantized feature values in the fixed point form, and storing the quantized feature values in the fixed point form in the memory space.

In accordance with another aspect of the present disclosure, there is provided a computing device for determining an FL value, which is an FL parameter corresponding to a size of an LSB included in quantized values, including: at least one memory that stores instructions; and at least one processor configured to execute the instructions to: perform processes of (I) applying quantization operations to the original values by referring to (i) a BW value, which is a BW parameter corresponding to the number of bits used to represent each of the quantized values, and (ii) each of FL candidate values, to thereby generate each of quantized vectors, including the quantized values, corresponding to each of the FL candidate values; (II) generating each of weighted quantization loss values, corresponding to each of the FL candidate values, by applying weighted quantization loss operations to information on each of differences between the original values included in an original vector including original values and the quantized values included in each of the quantized vectors; and (III) determining the FL value among the FL candidate values by referring to the weighted quantization loss values.

As one example, at the process of (I), the quantization operations follow a formula below $$ak-th \text{ element of } \vec{Q}_l = \min\left(2^{BW-FL-1}, \max\left(-2^{BW-FL-1}, \frac{[x_k \times 2^{FL} + \epsilon]}{2^{FL}}\right)\right)$$

wherein $\vec{Q}_l$ is an l-th quantized vector, $x_k$ is a k-th original value included in the original vector, $\epsilon$ is a constant for determining a type of the quantization operation, and [ ] is a Gaussian operation.

As one example, at the process of (II), the weighted quantization loss operations generate each of the weighted quantization loss values corresponding to each of the FL candidate values by referring to a weight vector, wherein the weight vector includes at least part of weight values generated by referring to sizes of the original values.

As one example, at the process of (II), the weighted quantization loss operation follows a formula below, $L_l = \|\vec{W} \cdot (\vec{Q}_l - \vec{x})\|_p$ wherein $\vec{x}$ is the original vector, $Q_l$ is an l-th quantized vector, $\vec{W}$ is a weight vector, which includes at least part of weight values generated by referring to sizes of the original values · is an operation that generates an integrated vector whose elements are determined as results of element-wise multiplication of the weight vector $\vec{W}$ and a difference vector $(\vec{Q}_l - \vec{x})$, and $\| \|_p$ is an L-P norm operation.

As one example, the original values include (i) CNN parameters of an arbitrary specific layer in a CNN and (ii) feature values of a feature map, corresponding to a training image to be used for determining the FL value, while the specific layer is processing the feature map.

As one example, the FL value is an optimized value so that the weighted quantization loss values are smaller than a threshold value when the values of the feature map are quantized, at least part of the values of the feature map being included in different channels thereof.

As one example, the processor further performs a process of: (IV) applying the quantization operations to parameters included in each layer of a CNN by referring to the FL value and the BW value, to thereby generate quantized parameters.

As one example, the processor further performs processes of: (V) if test values are acquired, instructing the CNN to apply convolution operations to the test values by using the quantized parameters to thereby generate test feature values, and instructing the CNN to accumulate the test feature values; and (VI) applying the quantization operations to the accumulated test feature values by referring to the FL value and the BW value to thereby generate quantized test feature values, and storing the quantized test feature values in a memory space.

As one example, at the process of (V), the test values are acquired in a fixed point form, and the test feature values are generated in a floating point form, and the processor instructs the CNN to accumulate the test feature values in the floating point form, and wherein, at the process of (VI), the processor generates the quantized feature values in the fixed point form, and storing the quantized feature values in the fixed point form in the memory space.

BRIEF DESCRIPTION OF THE DRAWINGS

The drawings attached below to explain example embodiments of the present disclosure are only part of example embodiments of the present disclosure and other drawings may be obtained based on the drawings without inventive work for those skilled in the art.

DETAILED DESCRIPTION OF THE PREFERRED EMBODIMENTS

Figure 1:
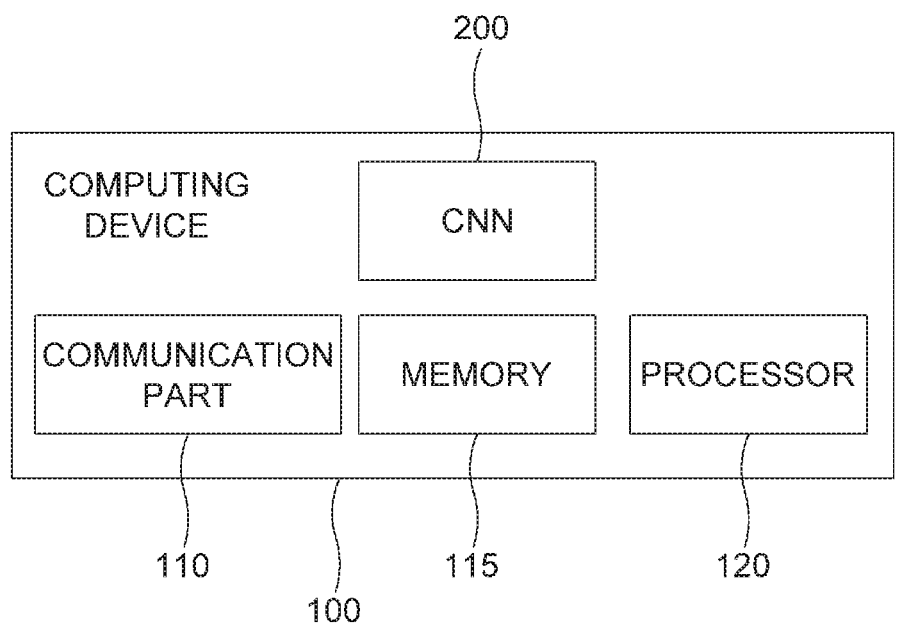
FIG. 1 shows a configuration of a computing device capable of determining an FL value in accordance with the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

Figure 2:
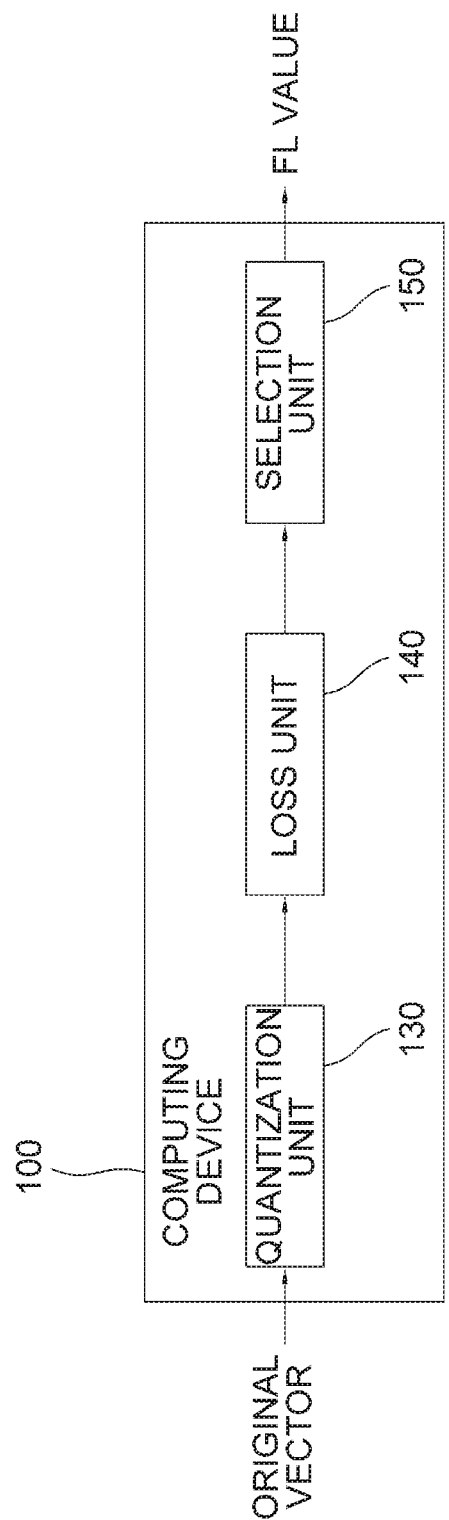
FIG. 2 shows a configuration of internal units included in the computing device in accordance with the present disclosure.

FIG. 1 shows a configuration of a computing device 100 capable of determining an FL value in accordance with the present disclosure and FIG. 2 shows a configuration of internal units included in the computing device in accordance with the present disclosure.

By referring to FIG. 1 and FIG. 2, the computing device 100 may include a CNN 200, a quantization unit 130, a loss unit 140, and a selection unit 150. Functions of inputting and outputting various data and those of operating the various data of the CNN 200, the quantization unit 130, the loss unit 140 and the selection unit 150 may be performed by a communication part 110 and a processor 120 therein respectively. But, in FIG. 1, detailed explanation on how the communication part 110 and the processor 120 are connected is omitted. In addition, the computing device may further include a memory 115 capable of storing computer readable instructions for performing following processes. As one example, the processor, the memory, a medium, etc. may be integrated with an integrated processor.

Prior to explaining the method for determining the FL value in accordance with the present disclosure, a specific explanation on the FL value and a BW value will be provided below.

In the computing device 100, values are represented as a binary form. Herein, an MSB, i.e., a most significant bit, is a position of a bit having the largest value in a binary number. On the contrary, an LSB, i.e., a least significant bit, is a position of a bit having the smallest value in a binary number, i.e., a unit value. And, a BW value, i.e., a bit width, is a BW parameter representing the number of bits used to represent values as the binary number.

Meanwhile, the FL value represents an FL parameter corresponding to a size of an LSB included in quantized values. Specifically, it is related to the LSB and the BW value. Herein, the number represented by the LSB is a power of 2, and the FL value is an absolute value of an exponent of the number represented by the LSB. For example, if a number represented by the LSB is 0.125, i.e., $2^{-3}$, the FL value corresponding to the LSB may be 3.

The FL value is used for quantizing a floating point value to a fixed point value by determining the size of the LSB. If the FL value is too small, large values may not be quantized properly. On the contrary, if the FL value is too large, small values may not be quantized properly.

For example, if the floating point values are 0.03125, 0.03126, and 0.03214, which are close to $\frac{1}{32}$, and if the FL value is determined as 4, the quantized fixed point value may be all 0 as the LSB represents $\frac{1}{16}$. If the small values are ignored as shown above, output values may be distorted.

On the contrary, if the floating point values are 0.25, 0.24, 0.26, which are close to ¼, and the BW value and the FL value are 4 and 10 respectively, then the LSB represents 1/1024. Thus, the maximum value represents 15/1024, which is insufficient to indicate the large values as shown above. The insufficient maximum value may cause distortion on the output values.

Thus, selecting the proper FL value in order to determine a size of the LSB is very important.

Above the FL value and the BW value are explained. Below a technique of determining the FL value will be explained, by referring to FIG. 2.

As mentioned above, the computing device 100 may include the quantization unit 130, the loss unit 140, and the selection unit 150.

First, the computing device 100 may acquire an original vector, including original values which are the floating point values to be quantized to the fixed point values, through the communication part 110. The original values may include (i) CNN parameters of an arbitrary specific layer in the CNN 200 and (ii) feature values of a feature map, corresponding to a training image to be used for determining the FL value, while the specific layer is processing the feature map.

If the original vector is acquired, the computing device 100 may instruct the quantization unit 130 to apply quantization operations to the original values by referring to the BW value and each of FL candidate values, to thereby generate each of quantized vectors, including the quantized values, corresponding to each of the FL candidate values. After, the computing device 100 may instruct the loss unit 140 to generate each of weighted quantization loss values, corresponding to each of the FL candidate values, by applying weighted quantization loss operations to information on each of differences between the original values included in the original vector and the quantized values included in each of the quantized vectors. And, the computing device 100 may instruct the selection unit 150 to determine the FL value among the FL candidate values by referring to the weighted quantization loss values.

The quantization unit 130, the loss unit 140 and the selection unit 150 may be configured as a software, but it may not be limited to this.

First, how the computing device 100 instructs the quantization unit 130 to determine a range of the FL candidate values will be explained.

The range of the FL candidate values are determined by referring to the BW value, the largest value and the smallest value among the original values. An FL candidate value capable of representing the largest value with corresponding MSB is the smallest FL candidate value, and an FL candidate value capable of representing the smallest value with corresponding LSB is the largest FL candidate value.

For example, assume that the largest value among the original values is 0.26, the smallest value among the original values is 0.000142, and the BW value is 4. To represent 0.26 in a binary form, the MSB should be at least $2^{-2}$. Thus, the LSB is $2^{-5}$ due to the BW value. Accordingly, the smallest FL candidate value for the original vector is 5.

And, to indicate 0.000142 in the binary form, the MSB should be at least $2^{-13}$. Thus, the LSB is $2^{-16}$ and the largest FL candidate value for the original vector is 16. In this case, the range of the FL candidate values is from 5 to 16.

After the range of the FL candidate values is determined as shown above, the computing device 100 may instruct the quantization unit 110 to apply quantization operations to the original values by referring to the BW value and each of the FL candidate values. Thus, the quantization operations may be explained specifically below.

The quantization operations may follow a formula below.

$$ak - th \text{ element of } \vec{Q_l} = \min\left(2^{BW-FL-1}, \max\left(-2^{BW-FL-1}, \frac{[x_k \times 2^{FL} + \epsilon]}{2^{FL}}\right)\right)$$

Herein, $\vec{Q_l}$ may be an l-th quantized vector, $x_k$ may be a k-th original value included in the original vector, and [ ] may be a Gaussian operation, i.e., a low floor operation. The FL and the BW in the formula may be the same as the FL value and the BW value which were explained so far. $\epsilon$ may be a constant for determining a type of the quantization operation. If $\epsilon$ is 0.5, the original value is rounded to a nearest integer. If $\epsilon$ is 0, the original value is rounded off. If $\epsilon$ is a random value, the original value is rounded stochastically.

Next, the weighted quantization loss operations performed by the loss unit 140 will be explained.

The weighted quantization loss operations generate each of the weighted quantization loss values by assigning weights to information on each of differences between the original values included in the original vector and the quantized values included in each of the quantized vectors. By using the weighted quantization loss values, relatively small values, which take dominant possession in values of a neural network, can be quantized properly.

The weighted quantization loss operations may follow a formula below, $$L_l = \|\vec{W} \cdot (\vec{Q_l} - \vec{x})\|_p$$

Herein $\vec{x}$ may be the original vector, $Q_l$ may be an l-th quantized vector, $\vec{W}$ may be a weight vector, which includes at least part of weight values generated by referring to sizes of the original values, · may be an operation that generates an integrated vector whose elements are determined as results of element-wise multiplication of the weight vector $\vec{W}$ and a difference vector $(\vec{Q_l} - \vec{x})$, not an inner product operation, and $\| \ \|_p$ may be an L-P norm operation.

Accordingly, after the information on the each of differences between the original values and the quantized values is generated for the difference vector $(\vec{Q_l} - \vec{x})$, the loss unit 140 may element-wise multiply the weight vector W and the difference vector $(\vec{Q_l} - \vec{x})$, to thereby generate the integrated vector. And, the loss unit 140 may apply L-p norm operation to the integrated vector to thereby generate the weighted quantization loss values. Herein, components of the weight vector may be determined as inverse of the corresponding original values, in order to more reflect the quantization errors corresponding to the small values.

For example, if the original vector is (0.124, 0.249, 4.748) and the FL value is 2, the quantized vector is generated as (⅛, ¼, 19/4), and the difference vector is generated as (0.001, 0.001, 0.002). The weight vector corresponding to the original vector is generated as (8.06, 4.02, 0.21), each component being inverse of each corresponding original value. On the contrary, a weight vector used in the conventional method for determining FL values may be a vector whose components are all zeros except the component which is 1, corresponding to the largest value among the original values, so that only the quantization error corresponding to the largest value among the original values is reflected on quantization loss values.

In the example above, the original value 4.748 is much larger than the other original values. Large values may have large effect on variations of the quantized values of a feature map being included in different channels thereof. The biggest difference between the conventional method and the present disclosure is whether large weights are assigned to these large values or not. How the difference influences the variations will be explained later.

After element-wise multiplying the weight vector and the difference vector, the L-p norm operation may be applied to the integrated vector to thereby generate the weighted quantization loss values.

For example, by element-wise multiplying the original vector and the weight vector on the example above, the resulting vector is generated as (0.00806, 0.004748, 0.00042). Herein, by assuming p as 2, the weighted quantization loss value is calculated as $\sqrt{(8.06\times0.001)^2+(4.748\times0.001)^2+(0.21\times0.002)^2}$, i.e., 0.0093

By following the method shown above, not only the quantization errors corresponding to the small values, which take dominant possession of the original values, but also the quantization errors on large values can be reflected together on the weighted quantization loss value.

As another example, by determining all the components of the weight vector as 1, not only quantization errors corresponding to the small values and but also those corresponding to the large values can be reflected on the weighted quantization loss values. Processes using the weight vector whose components are all 1 may be similar to the processes explained above, so explanation on this will be omitted.

On the condition that the weighted quantization loss is generated as shown above, the FL value among the FL candidate values is determined. The computing device 100 may instruct the selection unit 150 to select the smallest weighted quantization loss value, and to determine a specific FL candidate value, corresponding to the smallest weighted quantization loss value as the FL value, among the FL candidate values.

Above how to determine the FL value in accordance with the present disclosure was explained. Below how the FL value is used in neural network operations will be explained.

The computing device 100 first applies the quantization operations to CNN parameters included in each layer of a CNN, which are in a floating point form, by referring to the FL value and the BW value, to thereby generate quantized parameters, which are in a fixed point form.

After, if test values are acquired, the computing device 100 instructs the CNN 200 to apply convolution operations to test values by using the quantized parameters to thereby generate test feature values, and instructs the CNN 200 to accumulate the test feature values in the floating point form.

Finally, the computing device 100 applies the quantization operations to the accumulated test feature values by referring to the FL value, which corresponds to the specific layer in the CNN 200, and the BW value to thereby generate quantized test feature values, and storing the quantized test feature values, which are the fixed point form, in a memory space.

By following the method shown above, the FL value may be an optimized value so that the weighted quantization loss values are smaller than a threshold value when the values of the feature map are quantized, at least part of the values of the feature map being included in different channels thereof. It can be seen in FIG. 3.

Figure 3:
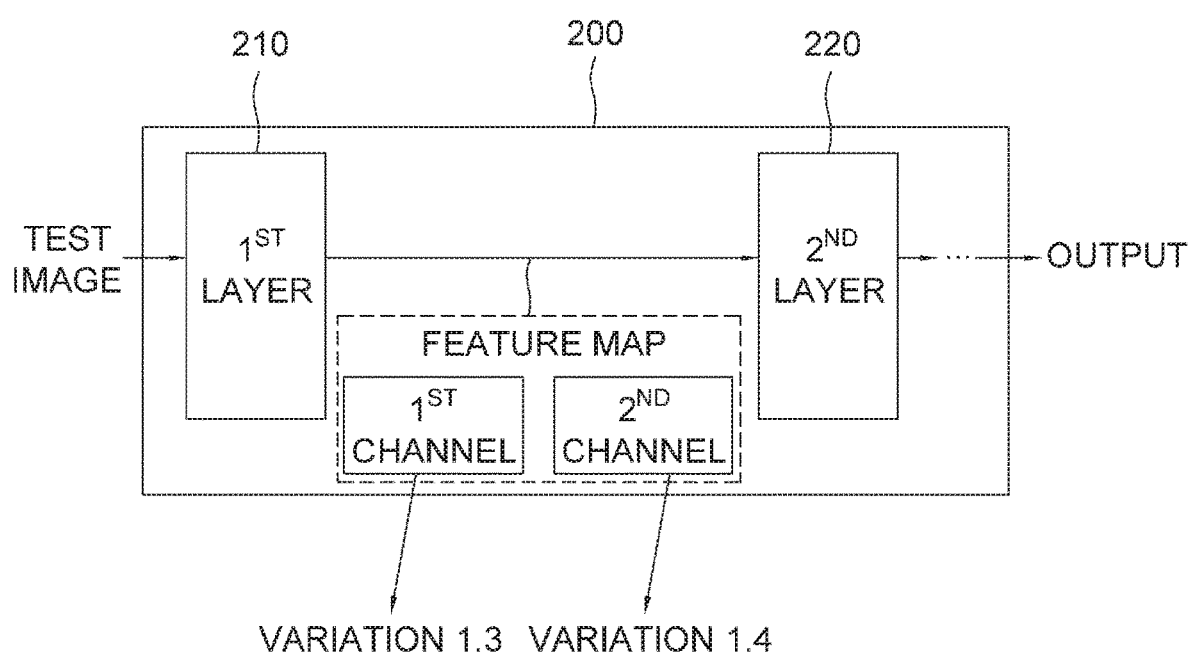
FIG. 3 shows each of variations of quantized values included in each of channels in accordance with the present disclosure.
Figure 4:
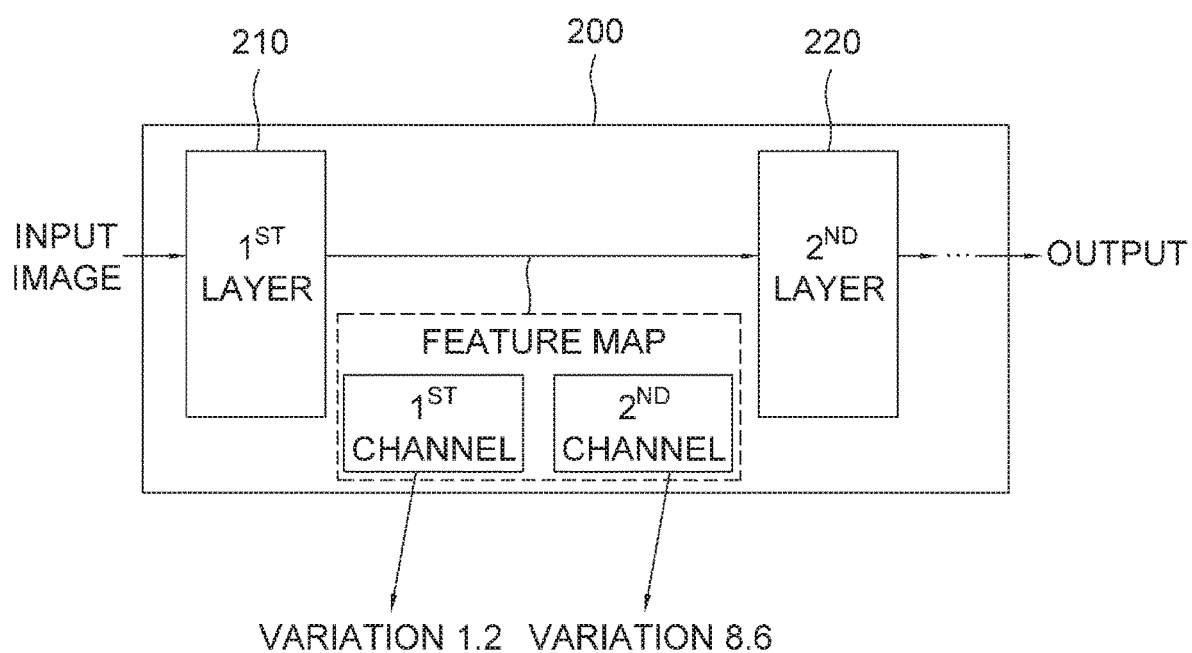
FIG. 4 shows each of variations of quantized values included in each of channels according to a conventional method.

FIG. 3 shows each of variations of quantized values included in each of channels in accordance with the present disclosure.

By referring to FIG. 3, it may be seen that while the feature map is processed by the first layer 210, difference between a first variation of the values included in the first channel and a second variation of the values included in the second channel is relatively smaller than that of the conventional method, owing to the method in accordance with the present disclosure.

It is an advantage of the present disclosure that distortion caused by a large difference among the variations of the values included in different channels can be avoided.

The method in accordance with the present disclosure can be used for optimizing hardware applicable to mobile devices, compact networks, and the like with high precision The objects of the technical solution of the present disclosure or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present disclosure or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present disclosure and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present disclosure has been explained by specific matters such as detailed components, limited embodiments, and drawings. While the disclosure has been shown and described with respect to the preferred embodiments, it, however, will be understood by those skilled in the art that various changes and modification may be made without departing from the spirit and scope of the disclosure as defined in the following claims.

Accordingly, the thought of the present disclosure must not be confined to the explained embodiments, and the following patent claims as well as everything including variants equal or equivalent to the patent claims pertain to the category of the thought of the present disclosure.

What is claimed is:

1. A method for determining an FL value, which is an FL parameter that is an absolute value of an exponent of a number represented by a LSB, least significant bit, included in quantized values, comprising steps of:

(a) a computing device, if an original vector including original values is acquired, applying quantization operations to the original values by referring to (i) a BW, bit width, value, which is a BW parameter corresponding to the number of bits used to represent each of the quantized values, and (ii) each of FL candidate values, to thereby generate each of quantized vectors, including the quantized values, corresponding to each of the FL candidate values;

(b) the computing device generating each of weighted quantization loss values, corresponding to each of the FL candidate values, by applying weighted quantization loss operations to information on each of differences between the original values included in the original vector and the quantized values included in each of the quantized vectors; and (c) the computing device determining the FL value among the FL candidate values by referring to the weighted quantization loss values, wherein at the step of (b), the weighted quantization loss operation follows a formula below, $$L_l = \|\vec{W} \cdot (\vec{Q}_l - \vec{x})\|_p$$

wherein $\vec{x}$ is the original vector, $Q_l$ is an l-th quantized vector, $\vec{W}$ is a weight vector, which includes at least part of weight values generated by referring to sizes of the original values · is an operation that generates an integrated vector whose elements are determined as results of element-wise multiplication of the weight vector $\vec{W}$ and a difference vector $(\vec{Q}_l - \vec{x})$, and $\|\ \|_p$ is an L-P norm operation.

2. A method for determining an FL value, which is an FL parameter that is an absolute value of an exponent of a number represented by a LSB, least significant bit, included in quantized values, comprising steps of:

(a) a computing device, if an original vector including original values is acquired, applying quantization operations to the original values by referring to (i) a BW, bit width, value, which is a BW parameter corresponding to the number of bits used to represent each of the quantized values, and (ii) each of FL candidate values, to thereby generate each of quantized vectors, including the quantized values, corresponding to each of the FL candidate values;

b) the computing device generating each of weighted quantization loss values, corresponding to each of the FL candidate values, by applying weighted quantization loss operations to information on each of differences between the original values included in the original vector and the quantized values included in each of the quantized vectors; and (c) the computing device determining the FL value among the FL candidate values by referring to the weighted quantization loss values, wherein, at the step of (a), the quantization operations follow a formula below, $$ak - th \text{ element of } \vec{Q}_l = \min\left(2^{BW-FL-1}, \max\left(-2^{BW-FL-1}, \frac{[x_k \times 2^{FL} + \epsilon]}{2^{FL}}\right)\right)$$

wherein, $\vec{Q}_l$ is an l-th quantized vector, $x_k$ is a k-th original value included in the original vector, $\epsilon$ is a constant for determining a type of the quantization operation, and [ ] is a Gaussian operation.

3. The method of claim 1, wherein, at the step of (b), the weighted quantization loss operations generate each of the weighted quantization loss values corresponding to each of the FL candidate values by referring to a weight vector, wherein the weight vector includes at least part of weight values generated by referring to sizes of the original values.

4. The method of claim 1, wherein the original values include (i) CNN parameters of an arbitrary specific layer in a CNN and (ii) feature values of a feature map, corresponding to a training image to be used for determining the FL value, while the specific layer is processing the feature map.

5. The method of claim 4, wherein the FL value is an optimized value so that the weighted quantization loss values are smaller than a threshold value when the values of the feature map are quantized, at least part of the values of the feature map being included in different channels thereof.

6. The method of claim 1, further comprising a step of:

(d) the computing device applying the quantization operations to parameters included in each layer of a CNN by referring to the FL value and the BW value, to thereby generate quantized parameters.

7. The method of claim 6, further comprising steps of:

(e) the computing device, if test values are acquired, instructing the CNN to apply convolution operations to the test values by using the quantized parameters to thereby generate test feature values, and instructing the CNN to accumulate the test feature values; and (f) the computing device applying the quantization operations to the accumulated test feature values by referring to the FL value and the BW value to thereby generate quantized test feature values, and storing the quantized test feature values in a memory space.

8. The method of claim 7, wherein, at the step of (e), the test values are acquired in a fixed point form, and the test feature values are generated in a floating point form, and the computing device instructs the CNN to accumulate the test feature values in the floating point form, and wherein, at the step of (f), the computing device generates the quantized feature values in the fixed point form, and storing the quantized feature values in the fixed point form in the memory space.

9. A computing device for determining an FL value, which is an FL parameter that is an absolute value of an exponent of a number represented by a LSB, least significant bit, included in quantized values, comprising:

at least one memory that stores instructions; and at least one processor configured to execute the instructions to: perform processes of (I) applying quantization operations to the original values by referring to (i) a BW, bit width, value, which is a BW parameter corresponding to the number of bits used to represent each of the quantized values, and (ii) each of FL candidate values, to thereby generate each of quantized vectors, including the quantized values, corresponding to each of the FL candidate values; (II) generating each of weighted quantization loss values, corresponding to each of the FL candidate values, by applying weighted quantization loss operations to information on each of differences between the original values included in an original vector including original values and the quantized values included in each of the quantized vectors; and (III) determining the FL value among the FL candidate values by referring to the weighted quantization loss values, wherein at the process of (II), the weighted quantization loss operation follows a formula below, $$L_l = \|\vec{W} \cdot (\vec{Q}_l - \vec{x})\|_p$$

wherein $\vec{x}$ is the original vector, $Q_l$ is an l-th quantized vector, $\vec{W}$ is a weight vector, which includes at least part of weight values generated by referring to sizes of the original values · is an operation that generates an integrated vector whose elements are determined as results of element-wise multiplication of the weight vector $\vec{W}$ and a difference vector $(\vec{Q}_l - \vec{x})$, and $\| \|_p$ is an L-P norm operation.

10. A computing device for determining an FL value, which is an FL parameter that is an absolute value of an exponent of a number represented by a LSB, least significant bit, included in quantized values, comprising:
   at least one memory that stores instructions; and
   at least one processor configured to execute the instructions to: perform processes of (I) applying quantization operations to the original values by referring to (i) a BW, bit width, value, which is a BW parameter corresponding to the number of bits used to represent each of the quantized values, and (ii) each of FL candidate values, to thereby generate each of quantized vectors, including the quantized values, corresponding to each of the FL candidate values; (II) generating each of weighted quantization loss values, corresponding to each of the FL candidate values, by applying weighted quantization loss operations to information on each of differences between the original values included in an original vector including original values and the quantized values included in each of the quantized vectors; and (III) determining the FL value among the FL candidate values by referring to the weighted quantization loss values, wherein, at the process of (I), the quantization operations follow a formula below, $$ak - th \text{ element of } \vec{Q}_l = \min\left(2^{BW-FL-1}, \max\left(-2^{BW-FL-1}, \frac{[x_k \times 2^{FL} + \epsilon]}{2^{FL}}\right)\right)$$

wherein, $\vec{Q}_l$ is an l-th quantized vector, $x_k$ is a k-th original value included in the original vector, $\epsilon$ is a constant for determining a type of the quantization operation, and [ ] is a Gaussian operation.

11. The computing device of claim 9, wherein, at the process of (II), the weighted quantization loss operations generate each of the weighted quantization loss values corresponding to each of the FL candidate values by referring to a weight vector, wherein the weight vector includes at least part of weight values generated by referring to sizes of the original values.

12. The computing device of claim 9, wherein the original values include (i) CNN parameters of an arbitrary specific layer in a CNN and (ii) feature values of a feature map, corresponding to a training image to be used for determining the FL value, while the specific layer is processing the feature map.

13. The computing device of claim 9, wherein the FL value is an optimized value so that the weighted quantization loss values are smaller than a threshold value when the values of the feature map are quantized, at least part of the values of the feature map being included in different channels thereof.

14. The computing device of claim 9, wherein the processor further performs a process of:
   (IV) applying the quantization operations to parameters included in each layer of a CNN by referring to the FL value and the BW value, to thereby generate quantized parameters.

15. The computing device of claim 14, wherein the processor further performs processes of:
   (V) if test values are acquired, instructing the CNN to apply convolution operations to the test values by using the quantized parameters to thereby generate test feature values, and instructing the CNN to accumulate the test feature values; and
   (VI) applying the quantization operations to the accumulated test feature values by referring to the FL value and the BW value to thereby generate quantized test feature values, and storing the quantized test feature values in a memory space.

16. The computing of claim 15, wherein, at the process of (V), the test values are acquired in a fixed point form, and the test feature values are generated in a floating point form, and the processor instructs the CNN to accumulate the test feature values in the floating point form, and
   wherein, at the process of (VI), the processor generates the quantized feature values in the fixed point form, and storing the quantized feature values in the fixed point form in the memory space.

* * * * *